United States Patent
Pubill et al.

(10) Patent No.: US 11,604,034 B2
(45) Date of Patent: Mar. 14, 2023

(54) METHOD FOR REFRIGERATING AN ISOTHERMAL BOX TO A TARGET TEMPERATURE AND ASSOCIATED FACILITY

(71) Applicant: CENTRE NATIONAL DE LA RECHERCHE SCIENTIFIQUE, Paris (FR)

(72) Inventors: Aleix Pubill, Saint Pierre dels Forcats (FR); Laurent Rigaud, St Hippolyte (FR); David Tadiotto, Bompas (FR); Driss Stitou, Saint Nazaire en Roussillon (FR); Nathalie Mazet, Perpignan (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 329 days.

(21) Appl. No.: 16/645,210

(22) PCT Filed: Sep. 7, 2018

(86) PCT No.: PCT/HR2018/052186
§ 371 (c)(1),
(2) Date: Mar. 6, 2020

(87) PCT Pub. No.: WO2019/048793
PCT Pub. Date: Mar. 14, 2019

(65) Prior Publication Data
US 2020/0292247 A1    Sep. 17, 2020

(30) Foreign Application Priority Data

Sep. 7, 2017  (FR) ...................................... 1770948

(51) Int. Cl.
*F28D 20/00* (2006.01)
*F25B 17/08* (2006.01)
*F25B 49/04* (2006.01)

(52) U.S. Cl.
CPC ............ *F28D 20/003* (2013.01); *F25B 17/08* (2013.01); *F25B 49/043* (2013.01); *F25B 2400/24* (2013.01); *F25D 2400/28* (2013.01)

(58) Field of Classification Search
CPC .. F28D 20/003; F25B 49/043; F25B 2400/24; F25D 2400/28; Y02E 60/14; C09K 5/16
(Continued)

(56) References Cited

U.S. PATENT DOCUMENTS 4,976,117 A * 12/1990 Crozat ..................... C09K 5/16
                                                      62/480
2012/0068104 A1   3/2012 Rached et al.
2017/0010028 A1   1/2017 Bao et al.

FOREIGN PATENT DOCUMENTS

CN    105992920 A    10/2016
CN    106010454 A    10/2016
(Continued)

OTHER PUBLICATIONS

International Search Report for PCT/FR2018/052186, dated Jan. 2, 2019.
(Continued)

*Primary Examiner* — Steve S Tanenbaum
(74) *Attorney, Agent, or Firm* — Sughrue Mion, PLLC

(57) ABSTRACT

The present invention concerns a method of refrigerating a housing to a target temperature according to which:
  an evaporator is placed in said housing;
  said evaporator is placed in fluid communication with a thermochemical reactor Ri,
(Continued)

simultaneously, the heat produced at said reactor Ri is evacuated;

Characteristically, at least n>1 other thermochemical reactors are provided;

- I) the pressure Pevi in said evaporator after it is placed in fluid communication with said thermochemical reactor Ri, and the temperature of said thermochemical reactor Ri connected to said evaporator, are determined;
- II) when the temperature difference DTRi between the temperature of said reactor Ri connected to said evaporator and the equilibrium temperature TeSi of said reactive mixture contained in said thermochemical reactor Ri at the pressure Pevi of said evaporator is equal to a first predetermined differential and/or when the temperature difference DTev between said evaporator and the interior of said housing is equal to a second predetermined differential, said reactor Ri is isolated from said evaporator and said evaporator is placed in fluid communication with at least one thermochemical reactor Ri+1 the pressure whereof is less than Pevi and/or the temperature is less than a predetermined value, simultaneously, all or part of the heat that is produced at said reactors Ri+1 connected to said evaporator is also evacuated,
- III) steps I and II are repeated with reference to the thermochemical reactor Ri+1 in fluid communication with said evaporator (E) until the target temperature in said housing C is obtained.

7 Claims, 9 Drawing Sheets

(58) Field of Classification Search
USPC .......................................................... 62/480
See application file for complete search history.

(56) References Cited

FOREIGN PATENT DOCUMENTS

| | | |
|---|---|---|
| DE | 28 46 728 A1 | 5/1979 |
| EP | 0 443 620 A2 | 8/1991 |
| FR | 2 873 793 A1 | 2/2006 |
| WO | 88/09466 A1 | 12/1988 |
| WO | 2014/013146 A1 | 1/2014 |
| WO | 2016/055127 A1 | 4/2016 |

OTHER PUBLICATIONS

Communication dated May 24, 2021, issued by the State Intellectual Property Office of the P.R.C. in application No. 201880069778.4.

\* cited by examiner

METHOD FOR REFRIGERATING AN ISOTHERMAL BOX TO A TARGET TEMPERATURE AND ASSOCIATED FACILITY

CROSS REFERENCE TO RELATED APPLICATIONS

This application is a National Stage of International Application No. PCT/FR2018/052186 filed Sep. 7, 2018, claiming priority based on French Patent Application No. FR 1770948 filed Sep. 11, 2017.

The present invention relates to a method of refrigerating an insulated housing to a target temperature and a facility enabling said method to be implemented.

The cold chain ensures the supply of more than half of food and sanitation goods. The refrigerated transport of such thermally-sensitive merchandise uses mostly vehicles that include a refrigerated insulated housing (thermally insulated) and a refrigeration system based on mechanical compression cycles of a refrigerant gas, often fluoride, where the mechanical compressor is supplied either by the alternator of the vehicle's engine, or by a specially dedicated internal combustion engine. This solution results in excessive consumption of fuel of 1 to 3 liters per 100 km traveled, resulting in an increase in $CO_2$ emissions.

The quality of the thermally sensitive products is closely tied to the fluctuations in temperature throughout the cold chain. Regulations are more and more demanding and require justifying that a precise and controlled temperature is maintained throughout the duration of the transport, all the way to the end user. A thermally sensitive product that is transported in different insulated housings from its point of departure to its end point inevitably undergoes oscillations in temperature due to the openings of the refrigerated compartment and to transfers of the product at distribution sites. In order to avoid these thermal fluctuations, insulated housings that are already at temperature must then be made available during unloading for logistical redistribution.

In order to limit the energy consumption related to maintaining empty housings awaiting loading, for logistical transport at a negative temperature, powerful cold-producing devices must then be used to quickly lower the temperature of the waiting housing at the moment it is used or just prior to its use, from the ambient temperature to the specified target temperatures which can, for example, be between −20° C. and −30° C. The target temperature must then be maintained for several hours in the insulated housing.

The document FR 2 873 793 describes a thermochemical system that comprises an evaporator and a thermochemical reactor. The reactor contains a reactive compound, a salt, specifically a metallic salt, capable of reacting chemically with the vapor phase of a liquefied fluid contained in the evaporator or in a reservoir connected to the evaporator. When the valve is opened to place the thermochemical reactor and the evaporator in fluid communication, the gaseous phase of the fluid spreads into the reactor and is consumed in the chemical synthesis reaction with the salt. The fluid in liquid phase is vaporized in the evaporator, absorbing the heat and therefore generating cold around the evaporator. The chemical synthesis reaction between the gaseous phase of the fluid and the reactive mixture contained in the reactor is a reversible exothermic reaction that therefore leads to an equilibrium. When the equilibrium pressure and equilibrium temperature defined for the exothermic reaction are reached in the reactor, the quantity of fluid in gaseous phase consumed by the exothermic reaction and [sic] equal to the quantity of fluid in gaseous phase regenerated by the inverse endothermic reaction.

The document WO 2014/013146 A1 describes a refrigeration system of an enclosure that uses a compression refrigeration unit and a refrigeration system comprising a thermochemical reactor that can be placed in fluid communication with an evaporator containing a fluid in liquid phase in equilibrium with its gaseous phase, by means of a valve. This type of facility cannot be used without a supply of external energy because of the refrigeration unit's compressor. However, due to the presence of the thermochemical system, low temperatures can be reached more quickly than with the refrigeration unit alone.

The document WO 88/09466 A1 describes a device that comprises at least two thermochemical reactors, an evaporator, a condenser, a gas manifold and means for successively triggering the solid-gas reactions in the two reactors from the gas coming from the evaporator and controlling the openings and closings of the different communication circuits in a predetermined order in order to obtain continuous cold production. In this document, the evaporator is connected to a first reactor. Once the reaction equilibrium is reached in this reactor and the pressure of the gas is therefore constant, a switch is made to the second reactor, the first one then being regenerated.

Furthermore, the document WO 2016/055127 A1 describes a refrigeration system that is not thermochemical but uses the adsorption of a gas on a solid, in this case water vapor on silica gel. The device comprises at least two adsorption reactors, each connected to an evaporator. The evaporator is first placed in communication with a first reactor, then when equilibrium of the adsorption reaction is reached, the evaporator is placed in communication with another reactor. The switchover from one reactor to the other can be controlled by measuring an ad hoc pressure and/or temperature. The refrigerating capacity is regulated by the gas flow entering the reactors. Such a device does not make it possible to obtain the same refrigerating capacity as a thermochemical system.

One purpose of the present invention is to propose a method of refrigerating a thermally insulated housing that makes it possible to increase the refrigerating capacity and therefore to increase the speed of cool-down in the housing.

Another purpose of the present invention is to propose a method as mentioned before that makes it possible to obtain the target temperature substantially quickly.

Another purpose of the present invention is to provide a method of refrigerating a thermally insulated housing to a temperature substantially equal to a target temperature Te that also makes it possible to maintain the temperature of the housing substantially equal to the target temperature, optionally without supplying outside energy for the cold production, in particular.

The present invention therefore concerns a method of refrigerating a thermally insulated housing to a target temperature Te according to which:
  an evaporator is placed in said housing, said evaporator containing a fluid in liquid phase in equilibrium with the gaseous phase thereof;
  said evaporator is placed in fluid communication with at least one thermochemical reactor Ri comprising a mixture comprising at least one reactive compound Si capable of chemically reacting with said fluid in gaseous phase to form a reaction product, said chemical synthesis reaction of said action product being exothermic and reversible; simultaneously, all or part of the heat produced at said reactor Ri is evacuated;

n other thermochemical reactors are provided, each containing a mixture containing at least one reactive compound optionally identical to said reactive mixture Si, n being a whole number equal to or greater than 1.

Characteristically, according to the invention:

optionally, an assembly is provided of at least one external thermochemical reactor different from said assembly of n reactors, and different from said reactor Ri;

I) the pressure Pevi present in the assembly formed by said evaporator placed in fluid communication with said thermochemical reactor(s) Ri, and/or the temperature of said thermochemical reactor(s) Ri placed in fluid communication with said evaporator, is determined;

II) when the temperature difference DTRi between the temperature of said reactors Ri which is(are) connected to said evaporator and the equilibrium temperature TeSi of said reactive mixture(s) Si contained in said thermochemical reactor(s) Ri at the pressure Pevi is equal to a first predetermined differential $\Delta T1$ and/or when the temperature difference DTev between said evaporator and the interior of said housing is equal to a second predetermined differential $\Delta T2$, said reactor(s) Ri is(are) isolated from said evaporator and said evaporator is placed in fluid communication with at least one thermochemical reactor Ri+1 chosen from among the n other thermochemical reactors not connected to said evaporator and the pressure whereof is less than Pevi and/or the temperature is less than a predetermined value, simultaneously, all or part of the heat that is produced at said reactor(s) Ri+1 connected to said evaporator is also evacuated, III) steps I and II are repeated with reference to said thermochemical reactor(s) Ri+1 in fluid communication with said evaporator until the differential between said temperature Te in said housing and said target temperature Te is equal to a third differential $\Delta T3$, and optionally the differential between said temperature Te in said housing and said target temperature Te is maintained less than or equal to said third differential $\Delta T3$ either by repeating steps I and II by placing said evaporator in fluid communication with at least one of the n+1 thermochemical reactors of said facility, or by placing said evaporator in fluid communication with an assembly of at least one external thermochemical reactor, different from said assembly of n reactors and different from said reactor Ri.

Cooling the reactor connected to the evaporator makes it possible to prevent the establishment of an equilibrium in the reactor. The synthesis reaction continues, therefore causing evaporation of the fluid in the evaporator. Thus, cold is produced at the evaporator.

The Applicants noted that the temperature of the reactor in fluid communication with the evaporator did not increase immediately due to the storage of a part of the heat released by the reactor in the reactor itself. At first, the heat released by the synthesis reaction is dissipated in the reactor itself, particularly by conduction. This first step of evacuation of the heat is fast and therefore makes it possible to quickly generate cold at the evaporator due to the rapid evaporation of the fluid.

Measuring/determining the temperature of the thermochemical reactor in fluid connection with the evaporator makes it possible to switch to another reactor before an equilibrium is established in the reactor connected to the evaporator; thus, an increase in pressure and temperature in the evaporator is avoided, which would lead to a lowering of the refrigerating capacity of the evaporator. The evaporator is therefore connected to another thermochemical reactor before equilibrium is established. The conditions are therefore reproduced that enable a peak refrigerating capacity to be obtained at the evaporator over a period of time. By a succession of these peaks, the refrigerating capacity of the evaporator is optimized and the temperature in the housing is lowered quickly.

Determining the temperature of each of the other reactors that are not connected makes it possible to ensure both that the pressure of that reactor is lower than the pressure in the evaporator as well as to avoid connecting the evaporator to a reactor that is too hot, which would risk shifting the equilibrium in the evaporator by thermal transfer of the fluids in phase flowing in the evaporator unit connected to the hot reactor. The gaseous-phase hot fluids would increase the temperature and pressure in the evaporator and would thus reduce the refrigerating capacity thereof.

When all the reactors contain the same reactive mixture, advantageously steps I and II are carried out with said reactors and the differential is maintained between said temperature Te in said housing and said target temperature Te, which is equal to a third differential $\Delta T3$, by means of the assembly of n reactors different from said reactor Ri.

When all the reactors do not have the same reactive compound, once the differential between said temperature in said housing and said target temperature Te is equal to a third differential $\Delta T3$, steps I and II are repeated, alternately placing said evaporator in fluid communication with only one part of the n+1 thermochemical reactors of said facility in order to maintain the differential between said temperature in said housing and said target temperature Te equal to a third differential $\Delta T3$, the other thermochemical reactors remaining isolated from said evaporator. Advantageously, the evaporator will first be connected to the reactors which contain a reactive mixture; therefore, the equilibrium curve on a Clausius-Clapeyron diagram is located farthest to the right. These compounds, the reaction products of which are regenerated at a higher temperature, are used to obtain the target temperature but not for maintaining the housing at temperature. The reactive mixture they contain can be totally consumed in the exothermic synthesis reaction during the phase enabling the target temperature to be reached.

It is also possible, irrespective of the embodiment, in step I to place said evaporator in fluid communication simultaneously or time-delayed with at least two thermochemical reactors, and particularly with two thermochemical reactors. The expansion of the gaseous-phase fluid is thus increased, and therefore the vaporization of the liquid-phase fluid which enables the refrigerating capacity to be increased at the evaporator.

The heat can be evacuated by forced convection, which is simple to implement.

The heat released by said chemical synthesis reaction at each of said reactors can also be at least partially evacuated by forced convection and/or by conduction, and potentially said evacuated heat can be stored in sensible form in a material and/or in latent form in a material capable of a phase change and/or capable of chemically reacting.

A portion of said n+1 thermochemical reactors can also be connected together thermally, and particularly thermally connecting said thermally connected thermochemical reactors two-by-two and placing a portion of said thermally connected reactors in fluid communication with said evaporator, the other portion being isolated from said evaporator, and at least partially evacuating by conduction the heat released by the exothermic synthesis reaction in said reactors in fluid communication with said evaporator to said reactors isolated from said evaporator. Thus, the evacuation of heat by forced convection can sometimes be dispensed with.

Advantageously, said thermally connected reactors form pairs of thermochemical reactors; said second thermochemical reactor of each of said pairs is placed in fluid communication with at least one condenser, said second thermochemical reactor containing a quantity of reaction product obtained during said chemical synthesis reaction and optionally a mixture containing a reactive compound Si not yet having reacted; said step I is implemented using said first thermochemical reactors, then step II using said second thermochemical reactors, or said steps I and II are implemented using said first thermochemical reactors and then, by conduction, all the heat released during the synthesis reaction in said first reactors is evacuated to said second reactors in order to decompose said reaction product contained in said second reactors and condenser, in said condenser, said fluid in vapor phase that has been regenerated in said second reactors, the condensation having taken place specifically at the temperature of said condenser, which can be the temperature outside said housing. Advantageously, all the heat from said synthesis reaction from said first reactors is evacuated to said second reactors so as to decompose the reaction product contained in said second reactors. The evacuation of the heat therefore does not require the use of any electrical energy.

One purpose of the present invention is to propose a facility for refrigerating a thermally insulated housing that makes it possible to refrigerate said housing down to a target temperature and which is capable of operating without the supply of energy from outside the facility or with a limited supply.

Another purpose of the present invention is to propose a facility as mentioned above which also makes it possible to maintain the temperature of the housing substantially equal to the target temperature, without the supply of energy from outside said facility.

The present invention relates to a facility for refrigerating a thermally insulated housing substantially to a target temperature Te, capable of enabling the implementation of the method of the invention, and of the type comprising:
  a thermally insulated housing;
  an evaporator arranged in said housing and containing a fluid in liquid phase in equilibrium with the gaseous phase thereof;
  at least one thermochemical reactor Ri containing a reactive mixture Si capable of chemically reacting with said gaseous-phase fluid in order to form a reaction product, said chemical synthesis reaction of said reaction product being exothermic and reversible, said thermochemical reactor Ri being capable of being placed in fluid communication with said evaporator via a duct Li equipped with valve-forming means;
  means of measuring the temperature in said thermally insulated housing;
  means of heating said thermochemical reactor(s) Ri which are capable of inducing the reverse endothermic reaction of decomposition of said reaction product, resulting in the regeneration of said reactive mixture and said gaseous-phase fluid;
  furthermore, at least n thermochemical reactors Ri+1, n being a whole number equal to or greater than 1, each reactor Ri+1 containing a reactive mixture Si+1, optionally identical to said reactive mixture Si and also capable of chemically reacting with said gaseous-phase fluid in order to form a reaction product, said chemical synthesis reaction of said reaction product being exothermic and reversible, each of said n thermochemical reactors being capable of being placed in fluid communication with said evaporator via a specific duct Li+1;
  a valve Vi+1 mounted on each of said ducts Li+1 and which in open position allows the fluid connection between said reactor and said evaporator, and in closed position, isolates said reactor Ri from said evaporator and from said other n thermochemical reactors;
  means of heating each of said thermochemical reactors Ri+1 which are capable of inducing the reverse endothermic reaction of decomposition of said reaction product, resulting in the regeneration of said reactive mixture and said gaseous-phase fluid; and
  heat evacuation means suitable for evacuating the heat generated by said synthesis reaction from each of said thermochemical reactors Ri and Ri+1 in which such reaction takes place.

Characteristically, the facility of the invention further comprises:
  means of comparing the difference between the temperature measured in said housing and said target temperature Te with a third predetermined differential $\Delta T3$; and/or
  means of determining the temperature Tev in said evaporator and/or the pressure Pev in said evaporator or in each of said reactors Ri and Ri+1;
  means of determining the temperature Ti in said reactor Ri and in each thermochemical reactor Ri+1 of said n+1 reactors;
  means of determining the differential DTev between the temperature of said housing and the temperature of said evaporator; and/or
  means of determining the differential DTRi between said determined temperature Ti and the equilibrium temperature TeSi of said reactive mixture Si contained in said thermochemical reactor Ri considered at said pressure Pevi determined in said evaporator; and/or
  means of comparing DTRi and/or DTev respectively with a first and a second predetermined differential, and
  means of controlling the open/closed position of each of said valves Vi and Vi+1, said means of control being coupled to said means of comparison and configured to place in fluid communication said evaporator with at least one thermochemical reactor Ri+1 chosen from among the thermochemical reactors that are not in fluid communication with said evaporator and for which the pressure is lower than the pressure Pevi determined in said evaporator and/or the temperature is lower than a given value when said comparison means have determined that DTRi and/or DTev is/are lower respectively than said first and said second differential;
  possibly an assembly of at least one external thermochemical reactor different from said assembly of n reactors and different from said reactor Ri and capable of being placed in fluid communication with said evaporator (E) by at least one duct equipped with valve-forming means;
and the means of control are coupled to the means of comparison in order to place the evaporator in fluid connection with at least one portion of said n reactors, when the differential between the temperature in said housing and the target temperature is equal to said third differential or to place the evaporator in fluid connection with said assembly of the at least external thermochemical reactor when the differential between the temperature in said housing and the target temperature is equal to said third differential.

The facility of the invention comprises only thermochemical reactors and no compressor. It is therefore capable of cooling the interior of the housing to the target temperature with no supply of external energy; the facility also comprises an electric battery capable of supplying the heat evacuation means when such means are of the type requiring such supply.

The means of determining the pressure Pev and/or of the temperature Tev in said evaporator E and/or the means of determining the temperature Ti in each thermochemical reactor Ri of the n+1 reactors are not limited according to the invention. It may involve pressure sensors and/or thermal sensors that make it possible either to measure the parameter concerned directly or to calculate it based on at least one other parameter and equilibrium curves of the different biphasic systems of the facility.

The means of control can comprise a microprocessor or a microcontroller.

The person skilled in the art is capable of choosing the reactive mixture or mixtures as well as the number of thermochemical reactors and the volume thereof based on the target temperature and the volume of the housing to be refrigerated. The greater the number of reactors, the more quickly the evaporator can be switched to another reactor for which the temperature and/or pressure are as mentioned above, and therefore lower loss of refrigerating capacity at the evaporator.

The fluid can be ammonia and the reactive mixture a mixture of expanded natural graphite with a salt chosen from metal salts, alkaline salts and alkaline earth salts.

According to a particular embodiment, it comprises at least three thermochemical reactors. This number makes it possible to quickly obtain the target temperature without the facility being too expensive to manufacture or requiring too much space.

All said reactors can incorporate the same reactive compound. They can then all be used to maintain the temperature in the housing according to the method of the invention.

According to another embodiment, the reactors each incorporates a different reactive mixture than the others.

According to another embodiment, one portion of said n+1 thermochemical reactors incorporate the same reactive mixture Si, the other thermochemical reactors each incorporating a reactive mixture Si+1 different from Si, while said reactive mixtures Si+1 may all be identical to each other, some different and some identical to each other or all different from each other.

According to one particular embodiment of the means for evacuating the heat, which can be combined with any of the aforementioned embodiments, said heat evacuation means enable the heat to be evacuated by forced convection, and comprise in particular at least one blower and/or said heat evacuation means are capable of evacuating the heat by conduction and optionally enable the storage of the evacuated heat in sensible form by storage in a material, and/or in latent form resulting from a change of physical state and/or a chemical reaction of the material into which the heat is evacuated.

The aforementioned heat evacuation means by conduction and/or storage are capable of functioning with no supply of electrical energy, unlike blowers, for example. They therefore enable the space and weight requirements of the facility to be reduced (it no longer includes a battery, for example) and avoid having to use any electrical energy source. The facility is therefore inexpensive and easy to transport. The use of a heat duct is not excluded from the present invention.

According to one variant of embodiment applicable to each of the aforementioned embodiments and to the combinations thereof, at least one portion of said n+1 reactors are thermally connected so that when one portion of said thermally connected reactors is in fluid communication with said evaporator when said valve-forming means are opened, the remaining portion of said thermally connected reactors is isolated from said evaporator and allows the evacuation by conduction of the heat released by said synthesis reaction into said reactors in fluid communication with said evaporator and also to store said evacuated heat in sensible form, resulting from the specific heat capacity of the reaction product and/or of the reactive mixture, and/or in latent form due to the decomposition of said reaction product. In this facility, one portion of the reactors serves for the evacuation of the heat, which allows the regeneration of the reactive mixture and the reuse of the regenerated reactors for cold production by placing them again in fluid communication with the evaporator. Such a facility is totally autonomous because the reactors also serve as means of heating reactors for the decomposition of the reaction product. The reactors can be thermally connected by convection and/or conduction.

Thus, one portion of said thermally connected reactors are contained within the others and in particular are nested one within the other, two-by-two, so as to enable a thermal connection, particularly by conduction by forming pairs of thermally connected thermochemical reactors.

According to one particular embodiment, at least one portion of said thermally connected reactors comprise hollow plates that reclose [sic] said reactive mixture and the plates of two reactors are mutually intercalated so as to connect said thermochemical reactors thermally by conduction and/or convection.

According to one embodiment that can be combined with any one of the aforementioned ones, said first reactors of each of said pairs of thermally connected thermochemical reactors are each connected to said evaporator by a duct specific to each of said reactors and equipped with valve-forming means, the installation further comprising at least one condenser that is connected to said second reactors by a duct equipped with valve-forming means, optionally, said second thermochemical reactors are optionally each connected to the evaporator by a duct specific to each reactor and equipped with valve-forming means, said control means are coupled to said comparison means and are configured to place in fluid communication said evaporator, either with a portion of said first reactors that were not connected to said evaporator, or with said second reactors, when the latter can be connected to said evaporator, when said comparison means have determined that DTRi and/or DTev is/are lower respectively than said first and said second differential.

The gaseous-phase fluid contained in the condenser can be the same as that of the evaporator. In this facility, the thermochemical reactors are regenerated by each other with no supply of electrical energy.

The evacuation of the heat is carried out with no supply of electricity by storing the heat due to the specific heat capacity of the materials and due to the chemical reaction and the change of state of the gas in particular (storage in latent form).

Advantageously, the facility comprises a thermal sensor for measuring the temperature in the housing, a thermal sensor for measuring the temperature in the evaporator and/or a pressure sensor for measuring the pressure in the latter and a temperature sensor disposed in each of the reactors or at the wall thereof in order to measure the temperature of each of the reactors. The facility therefore is robust and inexpensive to manufacture.

According to one particular embodiment of the means of determining/measuring the temperature of each reactor, each thermal chemical reactor Ri comprises a wall that defines an enclosure that encloses said reactive mixture and said means of determining the temperature of each thermochemical reactor Ri comprises means of measuring the temperature of the wall of each reactor Ri.

Definitions

Throughout the present application, the term "evaporator" designates any device comprising a fluid in liquid phase and in gaseous phase, in equilibrium. It may involve a simple reservoir, for example.

Throughout the present application, reaching the target temperature indicates that the temperature reached in the housing is equal to the target temperature Te plus the third predetermined differential that corresponds to a tolerance.

The present invention, its features and the various advantages it provides will be seen more clearly from the following description of four embodiments/implementations of said invention, presented by way of non-limiting examples and with reference to the appended drawings in which:

FIG. 1 schematically represents a first embodiment of the present invention;

Figure 6:
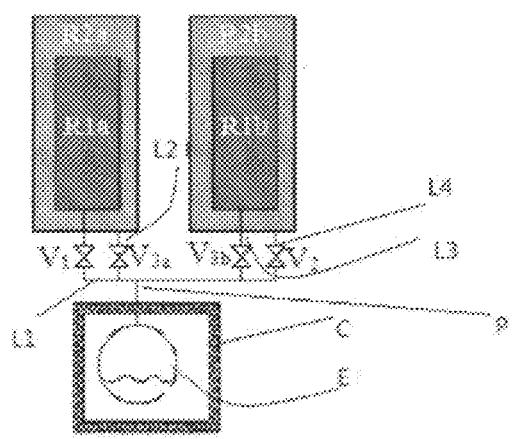
Figure 7:
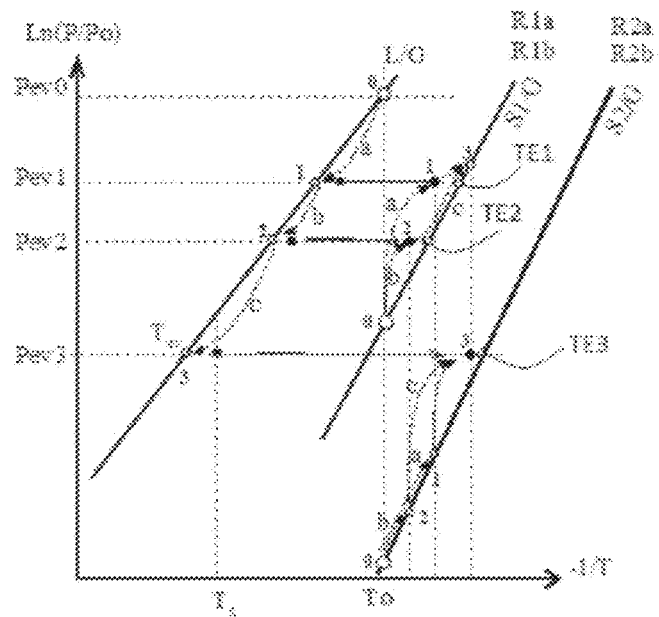
Figure 8:
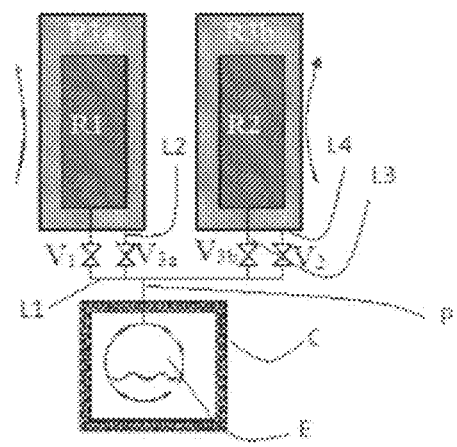
Figure 9:
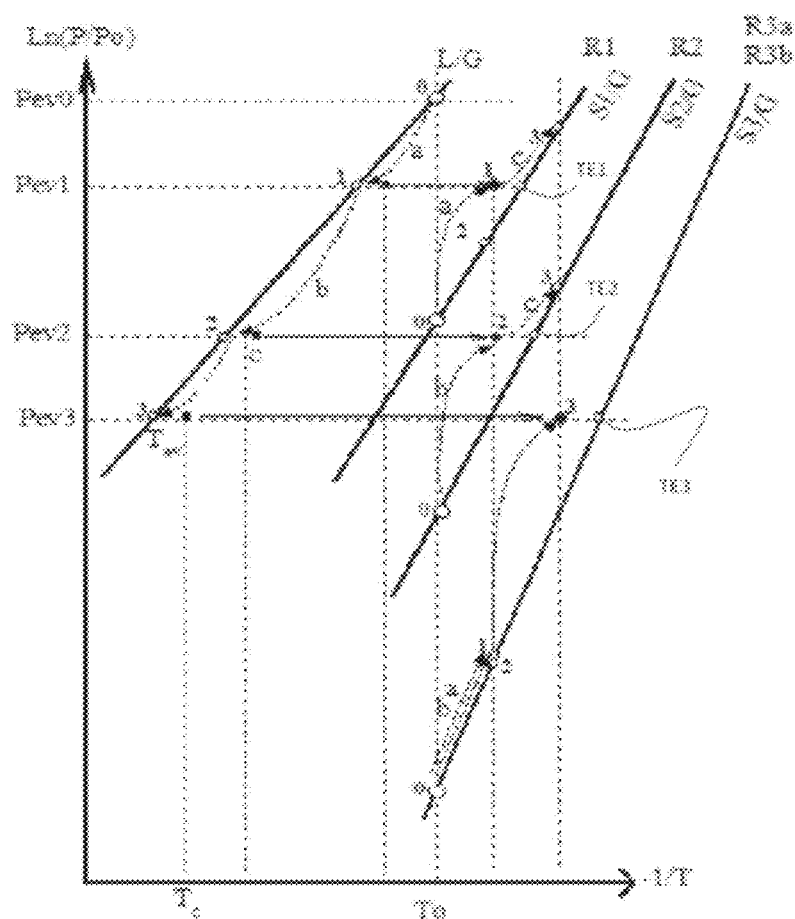
Figure 10:
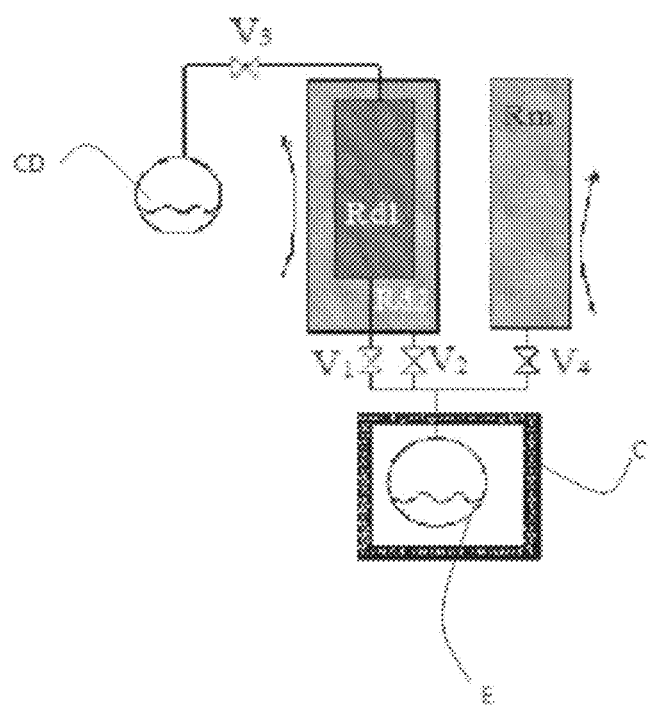
Figure 11:
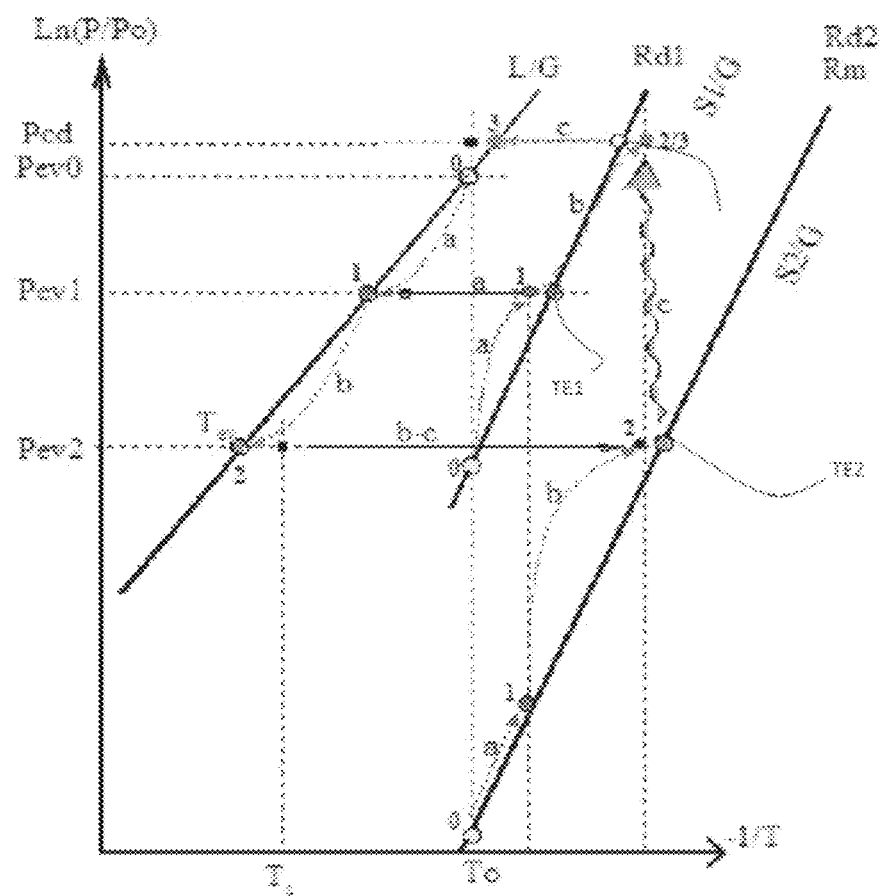
Figure 12:
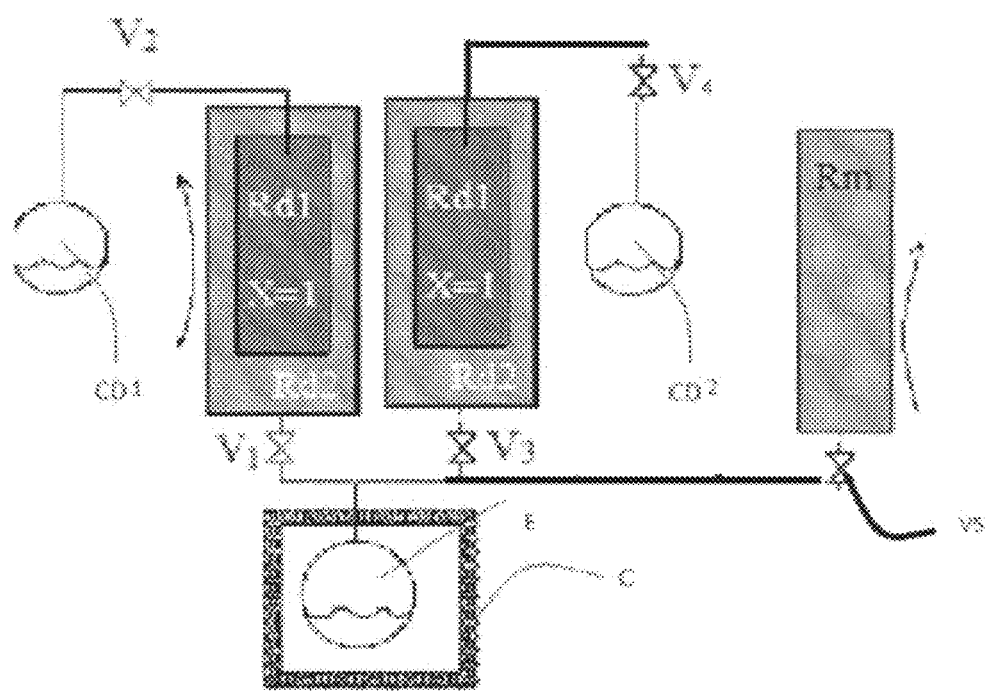
Figure 13:
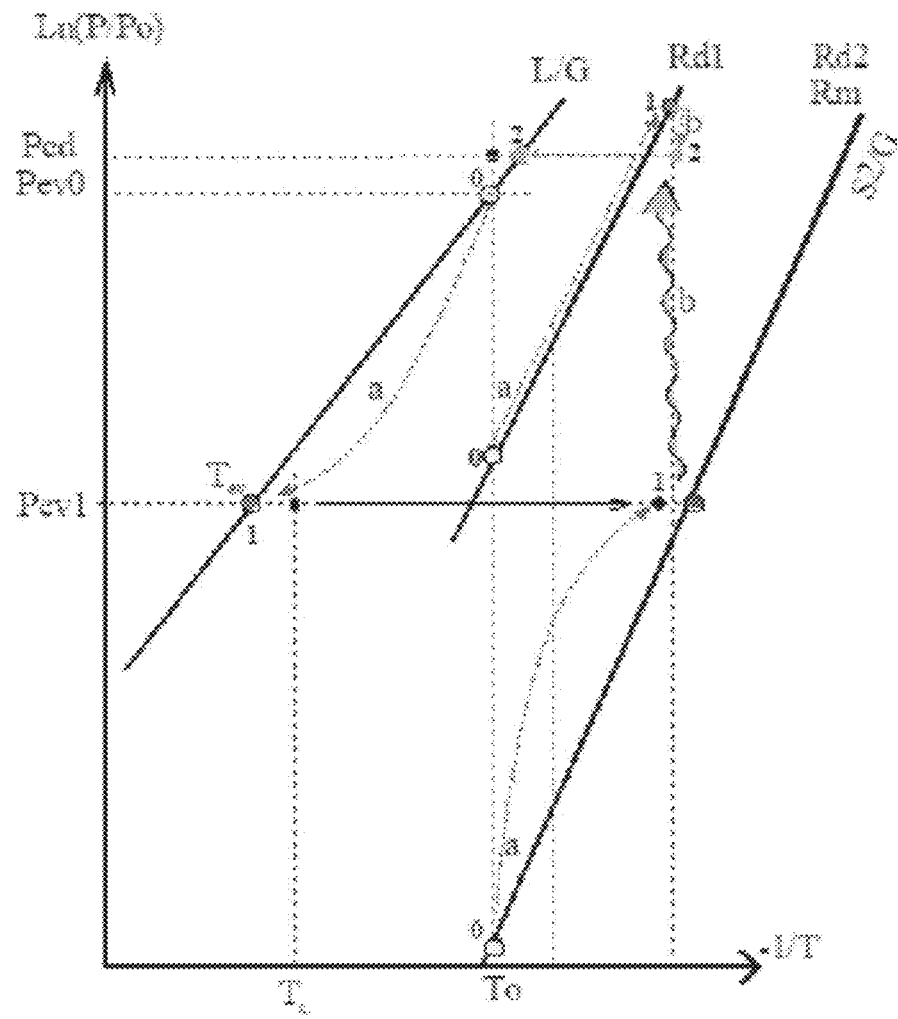

FIG. 6 schematically represents a third embodiment of the invention;

FIG. 7 represents the Clausius-Clapeyron diagram of the facility represented in FIG. 6;

FIG. 8 represents a fourth embodiment of the invention;

FIG. 9 represents the Clausius-Clapeyron diagram of the facility represented in FIG. 8;

FIG. 10 schematically represents a fifth embodiment of the facility of the invention;

FIG. 11 represents the Clausius-Clapeyron diagram of the facility represented in FIG. 10;

FIG. 12 schematically represents a sixth embodiment of the facility of the invention; and FIG. 13 represents the Clausius-Clapeyron diagram of the facility represented in FIG. 12;

FIRST EMBODIMENT AND IMPLEMENTATION

Facility Having 3 Reactors Comprising the Same Reactive Salt.

Figure 1:
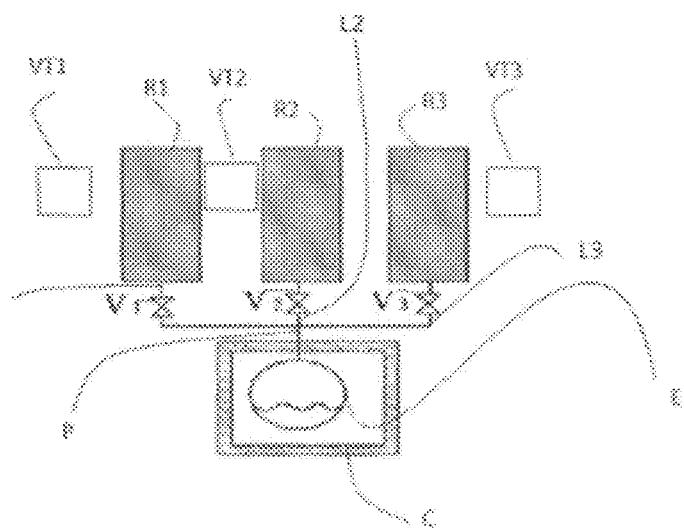

With reference to FIG. 1, this first embodiment comprises a reservoir E performing as an evaporator and containing a fluid in liquid phase in equilibrium with the gaseous phase thereof. Said reservoir/evaporator E is situated in an insulated housing C (or thermally insulated housing). The interior of the housing C is therefore refrigerated by the facility of the invention. The reservoir E is connected to a duct portion P that passes through the thermally insulated wall of the housing C. Said duct portion P is then divided into three ducts, respectively L1, L2 and L3. The duct L1 connects the interior of the reservoir E with the interior of the first thermochemical reactor R1. The first duct L1 comprises a first valve V1 mounted at the inlet of the first reactor R1. The second duct L2 connects the interior of the reservoir E with the interior of the second thermochemical reactor R2. The second duct L2 comprises a second valve V2 mounted at the inlet of the second reactor R2. The duct L3 connects the interior of the reservoir E with the interior of the third thermochemical reactor R3. The third duct L3 comprises a third valve V3 mounted at the inlet of the third reactor R3. Each reactor is equipped with an assembly comprising at least one blower, VT1, VT2 and VT3 respectively, capable of and arranged in order to optimize the dissipation by forced convection of the heat released by each of the reactors R1, R2 and R3.

For purposes of simplification, the control means and means of measuring/determining the temperature as well as means of comparison are not shown. Such means comprise a temperature sensor in the reservoir E, a temperature sensor placed in the housing C and a microcontroller or a microprocessor that enables values to be compared. Said sensors enable the temperature in the evaporator E and the temperature in the housing C to be measured, which allows the differential between said two temperatures to be determined. The facility also comprises a temperature sensor placed on the wall of each of the reactors R1 to R3, which allows the temperature changes in each of the reactors to be measured. The facility also comprises a pressure sensor that enables the pressure to be measured in the reservoir/evaporator E and/or in the thermochemical reservoir-reactor assembly connected to said reservoir E.

The operation of said first embodiment will now be described with reference to FIGS. 1 to 3.

Figure 2:
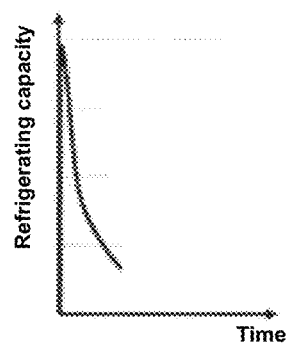
FIG. 2 represents a diagram of the change in the refrigerating capacity of the evaporator of FIG. 1 as a function of time, once it has been placed in fluid communication with a thermochemical reactor.

As shown in FIG. 2, when the reservoir E is placed in fluid communication with a thermochemical reactor, the refrigerating capacity at the reservoir increases quickly due to the difference in pressure of the fluid in gaseous phase in the evaporator and in the thermochemical reactor. The refrigerating capacity then decreases exponentially because of the pressure/temperature equilibrium that becomes established in the reactor and which depends on the reactive mixture used in the reactor.

The Applicants' distinction is therefore having had the idea to use the reservoir's peaks of refrigerating capacity that appear over a period of time once said reservoir has been placed in fluid communication with a thermochemical reactor of a lower pressure than that of said reservoir. The greater the difference in pressure between the reservoir and the reactor, the greater the generated refrigerating capacity.

Figure 3:
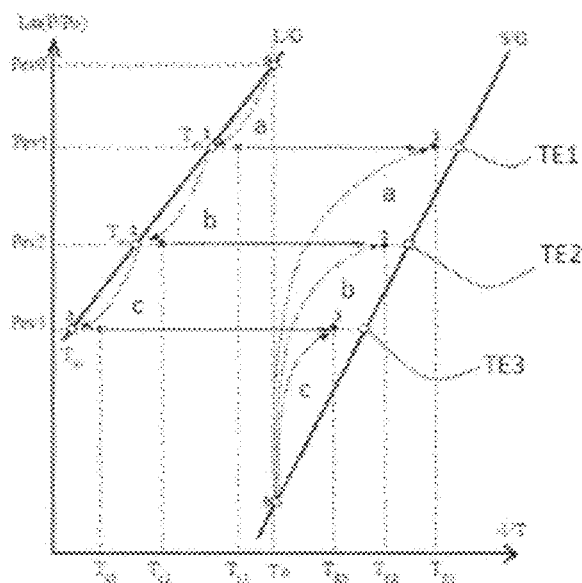
FIG. 3 represents the Clausius-Clapeyron diagram of the facility of FIG. 1.

FIG. 3 represents the Clapeyron diagram of the facility of FIG. 1. PO is the initial pressure in the reservoir/evaporator E. TO is the initial temperature in the reservoir/evaporator E. The line L/G corresponds to the pressure/temperature equilibrium of the liquid/gas biphasic system present in the reservoir E. The line S/G corresponds to the equilibrium of the gaseous phase/solid phase reaction system present in each of the reactors R1, R2 and R3, all having the same reactive compound.

Phase a:

The reservoir E is placed in communication with the reactor R1 by opening the valve V1. The valves V2 and V3 are closed. The fluid in gaseous phase enters the first reactor R1 and reacts with the reactive mixture that has not yet reacted. Preferably, the reactor R1 has just been regenerated. The result is a release of heat in the reactor R1 due to the exothermic chemical reaction. Said heat is partly absorbed by the reactor itself, i.e. stored in the form of sensible heat by the reactive mixture it contains, the wall of the reactor and the reaction product formed or already contained in the reactor R1. Another part of the heat is evacuated by the assembly of blowers VT1. The cooling of the first reactor R1 shifts the equilibrium of the exothermic reaction, which therefore is ongoing, and continues to generate the change of the fluid in liquid phase to the gaseous phase thereof, in the reservoir E. The pressure present in the reservoir E is the same as that of the reactor R1 and is equal to Pev1.

When the reaction heat can no longer be stored in the first reactor R1 nor be sufficiently evacuated by the set of blowers VT1, an equilibrium tends to be established in the first reactor R1. The temperature of the wall of the first reactor R1 then reaches a temperature TR1 close to the equilibrium temperature corresponding to the equilibrium point TE1 (see FIG. 3) of the gas/solid reaction system of the reactor R1 at the pressure Pev1. Said equilibrium temperature is not explicitly indicated in FIG. 3; it is deduced from the abscissa of point TE1, which is equal to −1/equilibrium temperature of the point TEL. The equilibrium point TE1 is the equilibrium of the reaction system of the reactor R1 at the pressure Pevi, i.e. corresponding to the pressure present in the first reactor R1. The temperature in the housing C is then Te1. When the differential DT1 between the temperature TR1 and the temperature corresponding to the equilibrium point TE1 is less than or equal to a predetermined differential, phase b is triggered.

Phase b:

To prevent the evaporation speed from becoming null in the reservoir E, phase b is triggered. The valve V1 at the inlet of reactor R1 is closed. The reactor R1 is then isolated from the reservoir E and continues to be cooled by ventilation by the assembly of blowers VT1, the pressure in the first reactor R1 falls due to the cooling of the reactor R1 and to the exothermic chemical reaction that can continue in the reactor R1, the temperature and pressure conditions being modified. The valve V2 is then closed. The reactor R2 and the reservoir E are placed in fluid communication. The valve V3 remains closed, as does the valve V1. A new pressure Pev2, lower than Pevi (because, on the one hand, the fluid and gaseous phase is expanded due to the increase in the volume in which it can spread, and on the other hand it is consumed in the reactor R2), is quickly established in the reservoir E and the reactor R2. The temperature of the reservoir E decreases to the value Tev2, which is the equilibrium temperature that is deduced from the line L/G. The fluid in gaseous phase passes from the reservoir E to the second reactor R2 and reacts with the compound contained therein. The same phenomena as described with reference to phase a are produced during said phase b in the second reactor R2. As soon as DTev, which is the difference between the temperature Tc2 in the housing C and the temperature Tev2 in the reservoir E, is less than a second predetermined differential, phase c is triggered. At that time, the second reactor R2 is at a temperature TR2 less than the equilibrium temperature thereof, which is deduced from reading the abscissa of the equilibrium point TE2 of the reactor R2 for the pressure Pev2.

Phase c:

The valve V2 at the inlet of reactor R2 is closed. The reactors R1 and R2 are still being cooled by ventilation by the assemblies of blowers VT1, VT2 and VT3. Their temperature and pressure continue to decrease. The valve V3 is opened. The reactor R3 and the reservoir E are placed in fluid communication. The fluid in gaseous phase contained in the reservoir E enters the third reactor R3 and reacts with the compound contained therein. An equilibrium is established in the third reactor R3, as explained with reference to phase a. The pressure in the reservoir E again falls to the value Pev3 and a new lower temperature Tev3 is obtained in the reservoir E. The temperature in the housing C is then Tc3, which is still lower than Tc2 and TO. The pressure in the reactor R3 is equal to the pressure in the reservoir, i.e. Pev3. The temperature TR3 of the reactor approaches the equilibrium temperature TE3, which is deduced from reading the abscissa of the equilibrium point TE3. The equilibrium point TE3 indicates the equilibrium temperature of the reactor R3 when the pressure in the reactor is equal to Pev3. The differential is then determined between said equilibrium temperature at point TE3 and the temperature TR3, or the differential between Tc3 in the housing C and the target temperature.

Subsequent Phases:

As long as the target temperature is not obtained (at a close tolerance [target differential]), phase a is repeated: in other words, the valve V3 is closed and the valve V1 is opened. The valve V2 remains closed. All the reactors are cooled by ventilation. The pressure is determined directly by measurement or indirectly for example by measuring the temperature of the reactor wall, in the reactors R1, R2 and R3, and the reservoir E is placed in fluid communication with one of the reactors having a lower pressure than the one present in the evaporator E. This is normally the reactor R1 since it is the one that has been cooled the longest.

The Applicant's distinction is to have reproduced, at each changeover from one reactor to another, the pressure conditions that make it possible to obtain peak cold production at the reservoir/evaporator E. By producing a succession of such peaks, the temperature in the reservoir E and thereby in the housing C is quickly reached.

Figure 4:
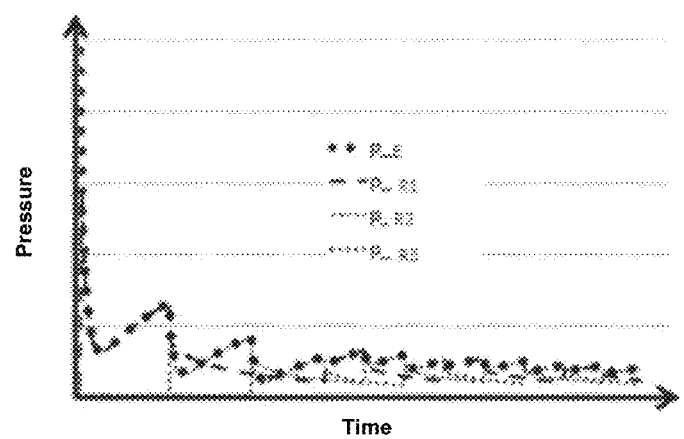
FIG. 4 represents the pressure variations in the evaporator and in each of the reactors of the facility represented in FIG. 1.

FIG. 4 represents the variations in pressure in the reactors R1, R2 and R3 and in the reservoir E as a function of time. It can be seen from FIG. 4 that three reactors can be used alternately both to achieve the lowering of temperature to the desired target temperature, as well as then to maintain the internal temperature of the refrigerated insulated housing at said target temperature.

During the temperature maintenance phase, as soon as the difference between the temperature in the housing C and the target temperature is equal to a third predetermined differential, the reservoir E is placed in fluid communication with one of the reactors and fluid communication is continued to be alternated between the reservoir E and each of the thermochemical reactors R1 to R3. By alternating the operation from one reactor to another, the temperature in the housing is maintained substantially equal to the target temperature.

Second Embodiment

Figure 5:
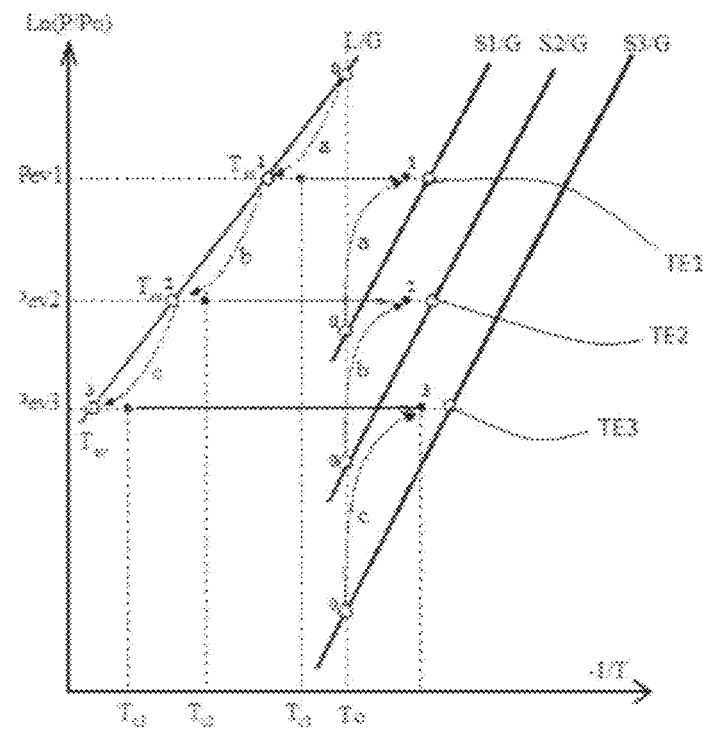
FIG. 5 represents the Clausius-Clapeyron diagram of a second embodiment.

Facility Comprising Three Reactors, Each Containing a Reactive Mixture Different from the Others In this second embodiment, the facility according to the invention comprises three reactors, each comprising a different reactive mixture from the others. The facility is the same as the one described with reference to FIG. 1. FIG. 5 represents the Clapeyron diagram of this facility. In FIG. 5, the lines S1/G, S2/G and S3/G represent the pressure/temperature equilibrium lines for each of the reaction systems contained respectively in the reactors R1, R2 and R3.

The embodiment of the method of the invention is similar to the one described with reference to the first embodiment as previously described. By using different reactive mixtures, reaching the target temperature in the housing C and/or reaching a lower target temperature can be accelerated.

According to one variant of implementation, the compound contained in the reactor R3, for which the equilibrium line is the farthest to the right in FIG. 5, is completely consumed during phases a and b. Said compound reacts with the fluid in gaseous phase to produce a reaction product that can be degraded during the reverse reaction at a higher temperature than the reaction products that will be generated in the reactors R1 and R2. Such a compound makes it possible to quickly obtain a very low temperature in the reservoir E and therefore in the housing C.

Such an embodiment is advantageous when the reactors R1 and R2 contain the same compound or different compounds, but which also allow the target temperature to be maintained in the temperature maintenance phase in the refrigerated insulated housing. The reactor R3 contains a reactive mixture making it possible to accelerate the decrease in temperature of the reservoir E. This enables the target temperature to be reached more quickly, but to the detriment of a subsequent regeneration of the reactor R3, which is more energy intensive. The reactor R3 is no longer used to maintain the housing C at temperature; only the reactors R1 and R2 are therefore used alternately to maintain the temperature in the housing C, as explained with reference to the first embodiment.

Third Embodiment

Facility Comprising Thermally Connected Reactors

The third embodiment of the facility of the invention is represented in FIG. 6. The elements common to both aforementioned embodiments are referenced identically. According to this third embodiment, the facility comprises four reactors, R1a, R1b, R2a and R2b which are thermally connected two by two. In the present case, the reactor R1a is contained in the reactor R2a, the two reactors are concentric and can exchange heat by conduction. Similarly, the reactor R1b is contained in the reactor R2b. A valve V1 installed in the line L1 enables the reservoir E to be placed in communication with the internal reactor R1a while the valve V3a installed in the line L2 enables the external reactor R2a to be placed in fluid communication with the reservoir E. The valve V2 installed in the line L4 allows the external reactor R2b to be placed in fluid communication with the reservoir E while the valve V3b installed in the line L3 enables the reservoir E to be placed in fluid communication with the internal reactor R1b.

According to one variant of embodiment not shown, the reactors each comprise a plurality of hollow plates containing a reactive compound. By intercalating the plates of two reactors, a transfer of heat is enabled from the reactive mixture of one to the reactive mixture of the other and vice versa.

In this third embodiment, the two internal reactors R1a and R2a contain the same reactive mixture S1 and the two external reactors R1b and R2b contain the same reactive mixture S2, which is different from the one in the aforementioned internal reactors.

The set of reactors contains the mass of reagent necessary also for the phase of maintaining the housing C at temperature.

FIG. 7 represents the Clapeyron diagram of the facility and shows the operation of this third embodiment. If the two external reactors also enable the phase of maintaining the housing C temperature. Each internal reactor R1a and R1b is dimensioned so as to react completely or partially as a result of the transfer of the reaction heat thereof to the external reactor containing it (respectively R2a and R2b). When the latter reactor enters its operating phase, the reaction heat thereof will be evacuated by ventilation by means of sets of blowers VT1 and/or VT2 (not shown in FIG. 6) and will be accumulated in the internal reactor that contains it. This configuration using one reactor nested in another also makes it possible to utilize the non-active reagent since it acts as a thermal capacitance absorbing the heat released by the other reactor in operation (storage of sensible heat).

The line S1/G represents the temperature/pressure correlation for the reactors R1a and R1b. The line S2/G represents the temperature/pressure equilibrium for the reactors R2a and R2b. The line L/G represents the correlation between the pressure and temperature at equilibrium in the reservoir E.

Phase a:

The valve V1 is opened. The reactive mixture S1 contained in the reactor R1a reacts. The temperature of the reactor R1a increases. The heat it releases is absorbed by the reactor R2a containing it. The pressure in the reservoir E-reactor R1a assembly is quickly stabilized at the value Pev1. As soon as the difference between the temperature of the external reactor R2a and the equilibrium temperature of the salt S1 at the equilibrium point TE1 is less than a first predetermined differential, the valve V1 is closed. It is assumed that the temperature of the internal reactor R1a is the same as that of the external reactor R2a.

Phase b:

The valve V2 is opened. The salt S1 of the reactor R1b reacts, which causes the temperature of the reactor R1b and of the reactor R2b containing it to rise. The pressure in the reservoir-reactor R1b assembly reaches equilibrium at the value Pev2. As soon as the difference between the temperature of the two reactors R1b and R2b and the equilibrium temperature corresponding to the equilibrium point TE2 is less than a second predetermined differential, the valve V2 is closed. Said equilibrium temperature is the temperature that corresponds to the equilibrium point TE2 for the salt S1 at the pressure Pev1, which is that of the reservoir E, in the Clausius-Clapeyron diagram.

Phase c:

The valves V1a and V3b are opened either simultaneously, or one after the other if the temperature difference between R2a and R2b exceeds a fourth predetermined differential. The hottest reactor must be allowed to cool sufficiently before being placed in communication with the reservoir E in order to avoid an increase in pressure in the reservoir E and therefore a drop in refrigerating capacity. The reactors R2a and R2b will now be considered, along with their equilibrium line S2/G. The same reasoning applies to these two reactors and the same phenomena as before are implemented.

Subsequent Phases:

The sequencing of the reactors can continue if their temperatures and pressures allow a new increase in the cooling capacity, until the target temperature is obtained. The maintenance of the temperature of the housing at the target value is then implemented by alternatively placing the reservoir E in communication with the external reactors R2 and R2b. The internal reactors are no longer used for maintaining temperature.

Fourth Embodiment and Implementation

This fourth embodiment is represented schematically in FIG. 8. The elements in common with the third embodiment are referenced identically. This fourth embodiment differs from the third embodiment in that the internal reactors R1 and R2 contain different reactive mixtures (salts). The reactor R1 is internal to the reactor R3a and the reactor R2 is internal to the reactor R3b. The reactors R1 and R2 contain different reactive mixtures S1 and S2. The reactors R3a and R3b contain the same reactive mixture S3.

FIG. 9 represents the Clausius-Clapeyron diagram of the facility. The operation of the invention will now be described with reference to FIGS. 8 and 9.

Phase a:

The valve V1 is opened. The reservoir E and the reactor R1 are placed in communication. The latter reacts and causes the temperature thereof and that of the reactor R3a to increase. Then, as soon as the temperature of the reactor R1 becomes close (first temperature differential) to the temperature corresponding to the equilibrium point TE1 corresponding to the pressure Pevi in the reservoir, V1 is closed.

Phase b:

The valve V2 is opened. The reactor R2 reacts and the temperature thereof therefore increases, which increases the temperature of the reactor R3b containing it. As soon as the differential between the temperature of the two reactors and the equilibrium temperature corresponding to the equilibrium point TE2 is less than a second predetermined differential, the valve V2 is closed.

Phase c:

Then valves V1a and V3b are opened simultaneously or one after the other, depending on whether or not the temperatures of the two reactors R3a and R3b are similar. These two reactors R3a and R3b ensure the decrease in temperature Te of the housing down to the target temperature with the two internal reactors, then maintenance at that temperature. The other two internal reactors are not used to maintain the temperature of the housing.

The aforementioned differentials throughout the description are determined experimentally and depend on the facility. The person skilled in the art is capable of determining them experimentally.

Fifth Embodiment and Fifth Mode of Implementation of the Method

FIG. 10 schematically represents a fifth embodiment of the facility according to the invention. The elements in common with the embodiments already described are referenced identically. The internal reactor Rd1 contains a salt S1. The external reactor Rd2 contains another salt S2. According to this fifth embodiment, the facility comprises a reactor Rm connected to the evaporator E by a line equipped with a valve V4. The facility also comprises a condenser CD fluidly connected to the internal reactor Rd1 via a duct equipped with a valve V3. The valves V1 and V2 enable the fluid connection of the evaporator E with the reactors Rd1 and Rd2 respectively.

The assembly of reactors is dimensioned in such a way that the internal reactor Rd1 can react completely or partially through the transfer of the reaction heat thereof to the reactor Rd2 containing it. When the latter reactor enters the operating phase thereof, a large part of the heat thereof will be transmitted towards Rd1. As soon as the temperature is sufficient, the salt Rd1 will enter regeneration. This decomposition reaction of the salt S1 absorbs a large part of energy which is of the same order of magnitude as what is released by the exothermic chemical reaction between the fluid in gaseous phase and the salt S2, in the reactor Rd2. This configuration using a nested reactor becomes very beneficial when the salts S1 and S2 are chosen so as to enable the decomposition of the salt S1. The reactor Rd1 is of dual value. First, it provides a first phase of decrease in temperature and pressure of the evaporator. Then, it absorbs a large part of the heat released by the reactor Rd2 and maintains the temperature thereof constant.

The operation of this fifth embodiment will now be described with reference to FIGS. 10 to 11.

Phase a:

The valve V1 is opened. The reactor Rd1 reacts and the temperature thereof increases along with that of the reactor Rd2 containing it due to the thermal transfer between the two nested reactors. A first pressure in the assembly is established at the pressure Pev1. As soon as the reactor Rd1 is no longer providing strong evaporation kinetics at the evaporator, V1 is closed.

Phase b:

The valve V2 is opened. The reactor Rd2 reacts. The temperature thereof increases and causes the temperature of the reactor it contains, Rd1, to increase as well, following the equilibrium temperature provided by the Clausius-Clapeyron diagram (line Rd2). The pressure between the evaporator E and the reactor Rd2 is established at the pressure Pev2.

Phase c:

The reaction heat from Rd2 continues to be absorbed by the reactor Rd1. The increase of the temperature in Rd1 causes an increase in the pressure in Rd1. The valve (or flap valve) V3 is opened as soon as the pressure is sufficient to be able to condense, under ambient temperature conditions of the condenser CD, the gaseous refrigerant fluid decomposed in Rd1. The regenerated refrigerant fluid in gaseous form is condensed in the condenser CD. The reaction enthalpy of the salt S2 and that of the salt S1 are of the same order of magnitude. The heat produced in Rd2 is therefore mostly absorbed by the regeneration of Rd1. Thus, the temperature of Rd2 is stabilized at the temperature corresponding to the regeneration temperature of Rd1. By a judicious choice of salts S1 and S2, a good differential at the equilibrium TE2 of S2 is maintained and the reaction kinetics are kept high. The refrigerating capacity in the evaporator E remains high for a longer period of time.

Temperature Maintenance Phase

When the temperature decrease phase of the housing is terminated, V3 is closed. Depending on whether Rd2 was dimensioned to ensure the temperature maintenance phase, V2 remains open. Otherwise, V2 is closed and the valve V4 is opened; thus, it is the reactor Rm that provides the temperature maintenance of the housing C.

Sixth Embodiment and Sixth Mode of Implementation

FIG. 12 schematically represents a sixth embodiment of the facility of the invention. The elements in common with the aforementioned fifth embodiment are referenced identically.

According to this embodiment, the facility comprises an evaporator E housed in the isothermal housing C (thermally insulated housing). The evaporator E is also connected fluidly with two reactor Rd2 which each contain a reactor Rd1 (reactors and thermal connection). The valve V1 makes it possible to cut off or place in fluid communication the evaporator E and the first external reactor Rd2. The internal reactors Rd1 are each in fluid communication with a condenser CD1 and CD2 but not with the evaporator E. The valve V2 makes it possible to cut off or place in fluid communication the condenser CD1 with the first internal reactor Rd1. The valve V3 enables the evaporator E to be isolated or placed in fluid communication with the second external reactor Rd2. The valve V4 enables the second condenser CD2 to be isolated or placed in fluid communication with the second internal reactor Rd1. The valve V5 enables the evaporator E and the external reactor Rm to be placed in fluid communication or isolated.

The assembly of reactors is dimensioned in such a way that the internal reactors Rd1 can absorb the reaction heat from the reactors Rd2 containing them. At first, the reaction heat is absorbed in sensible form and enables the reactor Rd1 to be heated to equilibrium, which increases in pressure. Then, when the temperature and pressure conditions allow, the reaction product obtained by the reaction between the reactive compound S1 and the fluid in gaseous phase coming from the evaporator E and contained in Rd1 goes into decomposition. The gaseous refrigerant fluid is condensed in the condenser CD1 and CD2 and the reactors Rd1 are regenerated. This decomposition reaction of the reaction product of the reactive compound S1 with the refrigerant fluid absorbs a large amount of energy, which is on the same order of magnitude as what is released by the chemical synthesis reaction between the reactive compound S2 of the reactor Rd2 and the gaseous refrigerant fluid coming from the evaporator E. Such configuration becomes very beneficial when the dimensioning and choice of reactive mixtures S1 and S2 enables a complete synthesis of Rd2 by the complete decomposition of the reaction product obtained by reaction between the reactive compound Si and the gaseous refrigerant fluid coming from the evaporator.

The operation of said sixth embodiment will now be described with reference to FIGS. 12 to 13.

First, the external reactors Rd2 are used alternately for the phases a) and b) explained with reference to the fifth embodiment.

The internal reactor RD1 of the external reactor RD2 in communication with the evaporator E undergoes an increase in the temperature and pressure thereof, following the equilibrium line thereof referenced Rd1 on the Clapeyron diagram of FIG. 13. The pressure between the evaporator E and the reactor Rd2 is established at the pressure Pev1.

The reaction heat from Rd2 continues to be absorbed by the reactor Rd1. The increase of the temperature causes an increase in the pressure in Rd1. The valve (or flap valve) V2 or V4 is opened as soon as the pressure is sufficient to be able to condense the gaseous refrigerant fluid decomposed in Rd1 at the temperature of the condenser CD1 or CD2. The regenerated refrigerant fluid in gaseous form is then condensed in the condenser CD1 or CD2. The reaction enthalpy of the reactive compound S2 and that of the reactive compound Si being of the same order of magnitude, the heat produced in Rd2 is mostly absorbed by the regeneration of Rd1. Thus, the temperature of Rd2 is stabilized at the temperature corresponding to the regeneration temperature of Rd1. By a judicious choice of reactive mixtures S1 and S2, at the reaction equilibrium in the reactor Rd2, a significant pressure differential between the evaporator E and the reactor Rd2 is thus maintained; the reaction kinetics are maintained at a high value and the refrigerating capacity at the evaporator E therefore remains high for each of the external reactors Rd2.

Temperature Maintenance Phase

When the temperature decrease phase in the housing C is terminated, V2 is closed. If the reactors Rd2 have been dimensioned to perform this phase, they are used to ensure maintenance at temperature. Otherwise, it is the reactor Rm that ensures the maintenance of the housing C temperature.

The invention claimed is:

1. A facility for refrigerating a thermally insulated housing (C) substantially to a target temperature Te, comprising:
a thermally insulated housing (C);
an evaporator (E) arranged in said housing (C) and containing a fluid in liquid phase in equilibrium with the gaseous phase thereof;
at least one thermochemical reactor Ri containing a reactive mixture Si capable of chemically reacting with said gaseous-phase fluid in order to form a reaction product, said chemical synthesis reaction of said reaction product being exothermic and reversible, said thermochemical reactor Ri being capable of being placed in fluid communication with said evaporator (E) via a duct Li equipped with valve-forming means (Vi);
means of evacuating the heat (VT1; VT2, Rd1; Rd2);
means of measuring the temperature in said thermally insulated housing (C);
means of heating said thermochemical reactor(s) Ri which are capable of inducing the reverse endothermic reaction of decomposition of said reaction product, resulting in the regeneration of said reactive mixture and said gaseous-phase fluid;
furthermore, at least n thermochemical reactors Ri+1, n being a whole number equal to or greater than 1, each reactor Ri+1 containing a reactive mixture Si+1, optionally identical to said reactive mixture Si and also capable of chemically reacting with said gaseous-phase fluid in order to form a reaction product, said chemical synthesis reaction of said reaction product being exothermic and reversible, each of said n thermochemical reactors being capable of being placed in fluid communication with said evaporator (E) via a specific duct Li+1;
a valve Vi+1 mounted on each of said ducts Li+1 and which in open position allows the fluid connection between said reactor and said evaporator (E), and in closed position, isolates said reactor Ri from said evaporator (E) and from said other n thermochemical reactors
means of heating each of said thermochemical reactors Ri+1 which are capable of inducing the reverse endothermic reaction of decomposition of said reaction product, resulting in the regeneration of said reactive mixture and said gaseous-phase fluid; and
heat evacuation means suitable for evacuating the heat generated by said synthesis reaction from each of said thermochemical reactors Ri and Ri+1 in which such reaction takes place;
means of comparing the difference between the temperature measured in said housing (C) and said target temperature Te with a third predetermined differential (ΔT3); and/or
means of determining the temperature Tev in said evaporator (E) and/or the pressure Pev in said evaporator (E) or in each of said reactors Ri and Ri+1;
means of determining the temperature Ti in said reactor Ri and in each thermochemical reactor Ri+1 of said n+1 reactors;
means of determining the differential DTev between the temperature of said housing (C) and the temperature of said evaporator (E); and/or
means of determining the differential DTRi between said determined temperature Ti and the equilibrium temperature TeSi of said reactive mixture Si contained in said thermochemical reactor Ri considered at said pressure Pevi determined in said evaporator (E); and/or means of comparing DTRi and/or DTev respectively with a first and a second predetermined differential (ΔT1; ΔT2), and means of controlling the open/closed position of each of said valves Vi and Vi+1, said means of control being coupled to said means of comparison and configured to place in fluid communication said evaporator (E) with at least one thermochemical reactor Ri+1 chosen from among the thermochemical reactors that are not in fluid communication with said evaporator (E) and for which the pressure is lower than the pressure Pevi determined in said evaporator (E) and/or the temperature is lower than a given value when said comparison means have determined that DTRi and/or DTev is/are lower respectively than said first and said second differential (ΔT1; ΔT2);

possibly an assembly of at least one external thermochemical reactor different from said assembly of n reactors and different from said reactor Ri and capable of being placed in fluid communication with said evaporator (E) by at least one duct equipped with valve-forming means;

and the means of control are coupled to the means of comparison in order to place said evaporator (E) in fluid connection with at least one portion of said n reactors, when the differential between the temperature in said housing and said target temperature Te is equal to said third differential ΔT3 or to place the evaporator (E) in fluid connection with said assembly of the at least external thermochemical reactor when the differential between the temperature in said housing and the target temperature is equal to said third differential ΔT3.

2. The facility according to claim 1, characterized in that each thermal chemical reactor Ri comprises a wall that defines an enclosure that encloses said reactive mixture and in that said means of determining the temperature of each thermochemical reactor Ri comprises means of measuring the temperature of the wall of each reactor Ri.

3. The facility according to claim 1, characterized in that said means for evacuating the heat enable the heat to be evacuated by forced convection, and specifically comprise at least one blower and/or in that said heat evacuation means are capable of evacuating the heat by conduction and optionally enable the storage of the evacuated heat in sensible form by storage in a material, and/or in latent form resulting from a change of physical state and/or a chemical reaction of the material into which the heat is evacuated.

4. The facility according to claim 3, characterized in that at least one portion of said n+1 reactors are thermally connected so that when one portion of said thermally connected reactors is in fluid communication with said evaporator (E) when said valve-forming means (Vi) are opened, the remaining portion of said thermally connected reactors is isolated from said evaporator (E), and in that said isolated portion is configured to allow the evacuation by conduction of the heat released by said synthesis reaction into said reactors in fluid communication with said evaporator (E) and also to store said evacuated heat in sensible form, resulting from the specific heat capacity of the reaction product and/or of the reactive mixture, and/or in latent form due to the decomposition of said reaction product.

5. The facility according to claim 4, characterized in that at least one portion of said thermally connected reactors comprise hollow plates that reclose [sic] said reactive mixture and in that the plates of two reactors are mutually intercalated so as to connect said thermochemical reactors thermally by conduction and/or convection.

6. The facility according to claim 4, characterized in that one portion of said thermally connected reactors are contained within the others and in particular are nested one within the other, two-by-two, so as to enable a thermal connection particularly by conduction by forming pairs of thermally connected thermochemical reactors.

7. The facility according to claim 6, characterized in that said first reactors of each of said pairs of thermally connected thermochemical reactors are each connected to said evaporator (E) by a duct specific to each of said reactors and equipped with valve-forming means, in that it further comprises at least one condenser (CD) that is connected to each of said second reactors by a duct equipped with valve-forming means, in that, optionally, said second thermochemical reactors are also each connected to said evaporator (E) by a duct specific to each reactor and equipped with valve-forming means, and in that said control means are coupled to said comparison means and are configured to place in fluid communication said evaporator (E), either with a portion of said first reactors that were not connected to said evaporator (E), or with said second reactors, when the latter can be connected to said evaporator (E), when said comparison means have determined that DTRi and/or DTev is/are lower respectively than said first and said second differential (ΔT1; ΔT2).

* * * * *